US007315672B2

(12) United States Patent
Kanie et al.

(10) Patent No.: US 7,315,672 B2
(45) Date of Patent: Jan. 1, 2008

(54) OPTICAL DEVICE

(75) Inventors: Tomohiko Kanie, Yokohama (JP); Makoto Katayama, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 174 days.

(21) Appl. No.: 10/993,172

(22) Filed: Nov. 22, 2004

(65) Prior Publication Data

US 2005/0123234 A1 Jun. 9, 2005

Related U.S. Application Data

(60) Provisional application No. 60/525,855, filed on Dec. 1, 2003.

(30) Foreign Application Priority Data

Nov. 28, 2003 (JP) .......................... P2003-398500

(51) Int. Cl.
*G02B 6/02* (2006.01)
*G02B 6/12* (2006.01)

(52) U.S. Cl. ............................ 385/18; 385/14; 385/31

(58) Field of Classification Search .................. 385/18, 385/14, 31
See application file for complete search history.

(56) References Cited

U.S. PATENT DOCUMENTS 5,960,132 A * 9/1999 Lin ............................ 385/18
6,081,632 A * 6/2000 Yoshimura et al. ............ 385/5
6,229,640 B1 * 5/2001 Zhang ........................ 359/290
6,240,222 B1 * 5/2001 Bergmann .................. 385/24
6,292,616 B1 9/2001 Tei et al.
6,363,183 B1 * 3/2002 Koh ........................... 385/19
6,404,969 B1 * 6/2002 Tayebati et al. ............ 385/140
6,522,800 B2 * 2/2003 Lucero ........................ 385/16
6,801,683 B2 * 10/2004 Kanie et al. .................. 385/18
2001/0008457 A1 * 7/2001 Zhang ........................ 359/238
2002/0126949 A1 9/2002 Welsh et al.
2002/0154854 A1 * 10/2002 Tayebati et al. .............. 385/18
2003/0031451 A1 2/2003 Hong et al.

(Continued)

OTHER PUBLICATIONS

Schumacher et al., "Monolithically integrated 20-channel optical add-/drop multiplexer sub-system with hybrid-integrated 40-channel photo detector array" Proceedings of the SPIE vol. 4947, Oct. 31, 2002 pp. 16-24 XP002314506.

(Continued)

*Primary Examiner*—K. Cyrus Kianni
(74) *Attorney, Agent, or Firm*—McDermott Will & Emery LLP

(57) ABSTRACT

An optical variable attenuator 1 has a planar waveguide 2 and an actuator structure 3. The planar waveguide 2 is provided with an input optical waveguide core 4A for input of an optical signal, an output optical waveguide core 4B for outputting an optical signal from the optical waveguide core 4A, and an a movable mirror optical waveguide core 4C for guiding light that does not enter the optical waveguide core 4B, out of the optical signal from the optical waveguide core 4A. The actuator structure 3 has a movable mirror 7 for reflecting the optical signal emerging from the input optical waveguide core 4A, toward the output optical waveguide core 4B. A light receiving device 10 for receiving light passing the optical waveguide core 4C is provided at one end face of the planar waveguide 2.

8 Claims, 10 Drawing Sheets

U.S. PATENT DOCUMENTS

| | | | |
|---|---|---|---|
| 2003/0103715 | A1 | 6/2003 | Kanie et al. |
| 2003/0117038 | A1 | 6/2003 | Marxer |
| 2003/0190113 | A1 | 10/2003 | Huang et al. |

OTHER PUBLICATIONS

Blonder "Silicon Optical Bench Research at AT&T Bell Laboratories" Lasers and Electro-Optics Society Annual Meeting, 1990. Leos '90. Conference Proceedings., IEEE Boston, MA, Nov. 4-9, 1990, pp. 350-353, XP010034572.

Ford, J., "Micromechanical wavelength add/drop switching: From device to network architecture", OFC 2003, vol. 1, TuN3, Mar. 23, 2003, pp. 253-255, XP-10680227.

European Search Report Issued In corresponding European Patent Application No. 04 028 115.6, dated Apr. 26, 2007.

* cited by examiner 60
61
63D
63A
63B
63C
64
8
8a
6a
6
7
62
66B
66C
65B
65C
67B
67c
IN
OUT1
OUT2
V
9

90
IN
OUT
DE MUX
MUX
CONTROLLER
Drop
Add
91
92
93
94
95
96
97
98
99
20
10

OPTICAL DEVICE

CROSS-REFERENCE TO RELATED APPLICATION

This application claims priority to Provisional Application Ser. No. 60/525,855 filed on Dec. 1, 2003 which is hereby incorporated by reference in their entirety.

BACKGROUND OF THE INVENTION

1. Field of the Invention

The present invention relates to optical devices incorporating an optical variable attenuator or the like, which are used in optical communications.

2. Related Background of the Invention

The optical devices incorporating the optical variable attenuator include those in which the optical variable attenuator is connected through an optical fiber to an optical monitor component, and those in which the optical variable attenuator is integrated with the optical monitor component, for example, as described in U.S. Pat. No. 6,292,616.

SUMMARY OF THE INVENTION

In the prior art, however, the optical devices consist of many components and the total size of the optical devices is large, so as to raise cost.

An object of the present invention is to provide optical devices with an optical monitor function that can be constructed in compact structure.

An optical device according to the present invention comprises an input optical waveguide for input of an optical signal; an output optical waveguide for outputting an optical signal from the input optical waveguide; an auxiliary optical waveguide for guiding light that does not enter the output optical waveguide, out of the optical signal from the input optical waveguide; a movable mirror for reflecting the optical signal from the input optical waveguide toward the output optical waveguide or toward the auxiliary optical waveguide; driving means for driving the movable mirror; and light monitoring means for monitoring light passing at least one of the input optical waveguide, the output optical waveguide, and the auxiliary optical waveguide.

Another optical device of the present invention comprises a planar optical waveguide, a movable mirror, a driver for driving the movable mirror, and a light receiving device. The planar optical waveguide has an input optical waveguide core, an output optical waveguide core, and an auxiliary optical waveguide core. The movable mirror reflects light from an output end of the input optical waveguide core. The light receiving device monitors light propagating in at least one of the input optical waveguide core, the output optical waveguide core, and the auxiliary optical waveguide core. The output end of the input optical waveguide core is optically coupled to an input end of one of the output optical waveguide core and the auxiliary optical waveguide core. The output end of the input optical waveguide core is optically coupled via the movable mirror to an input end of the other of the output optical waveguide core and the auxiliary optical waveguide core.

The foregoing optical devices can be used, for example, as optical variable attenuators. In this case, the driving means (driver) drives the movable mirror in an analog manner so as to vary the amount of reflected light on the movable mirror, to change the light quantity of the optical signal traveling from the input optical waveguide to the output optical waveguide, thereby adjusting the amount of optical attenuation. For example, the input optical waveguide (input optical waveguide core), the output optical waveguide (output optical waveguide core), and the auxiliary optical waveguide (auxiliary optical waveguide core) are formed of planar waveguides and the light monitoring means (light receiving device) is provided in the planar waveguides; whereby the optical variable attenuator with the optical monitor function (optical device) can be constructed in compact structure. By monitoring light passing the output optical waveguide or the auxiliary optical waveguide, it is feasible to obtain the light amount of the optical signal passing the output optical waveguide after attenuated.

Preferably, the light monitoring means comprises a light receiving device for receiving light passing the auxiliary optical waveguide, which is provided on the exit end side of the auxiliary optical waveguide. In this case, the light monitoring means can be constructed in a simplified configuration, so as to achieve reduction of cost.

Preferably, the light monitoring means comprises light branching means for extracting part of light passing at least one of the input optical waveguide and the output optical waveguide; and a light receiving device for receiving the light extracted by the light branching means. In this case, it is easy to obtain the light quantity of the optical signal passing the input optical waveguide before attenuated, or the light quantity of the optical signal passing the output optical waveguide after attenuated.

In this configuration, preferably, the light branching means is a branching optical waveguide forming a directional coupler, and the light receiving device is provided on the exit end side of the branching optical waveguide. In this case, the light quantity of the optical signal passing the input optical waveguide before attenuated can be immediately obtained by connecting the branching optical waveguide to the input optical waveguide, and the light quantity of the optical signal passing the output optical waveguide after attenuated can be immediately obtained by connecting the branching optical waveguide to the output optical waveguide.

The optical device may also have a configuration wherein the light branching means is a branching filter and wherein the light receiving device is provided at a position where light extracted by the branching filter is to be received. In this case, the light quantity of the optical signal passing the input optical waveguide before attenuated can be immediately obtained by providing the branching filter in the input optical waveguide, and the light quantity of the optical signal passing the output optical waveguide after attenuated can be immediately obtained by providing the branching filter in the output optical waveguide.

Furthermore, the optical device may have a configuration wherein the light branching means is a branching mirror and wherein the light receiving device is provided at a position where light extracted by the branching mirror is to be received. In this case, the light quantity of the optical signal passing the input optical waveguide before attenuated can be immediately obtained by providing the branching mirror in the input optical waveguide, and the light quantity of the optical signal passing the output optical waveguide after attenuated can be immediately obtained by providing the branching mirror in the output optical waveguide.

Another optical device of the present invention comprises an input optical waveguide for input of an optical signal; a first output optical waveguide and a second output optical waveguide for outputting an optical signal from the input optical waveguide; a movable mirror for reflecting the optical signal from the input optical waveguide toward the first output optical waveguide or toward the second output optical waveguide; driving means for driving the movable mirror; and light monitoring means for monitoring each of light passing the first output optical waveguide and light passing the second output optical waveguide.

Another optical device of the present invention comprises a planar optical waveguide, a movable mirror, a driver for driving the movable mirror, and a light receiving device. The planar optical waveguide has an input optical waveguide core, a first output optical waveguide core, and a second output optical waveguide core. The movable mirror reflects light from an output end of the input optical waveguide core. The light receiving device monitors light propagating in at least one of the input optical waveguide core, the first output optical waveguide core, and the second output optical waveguide core. The output end of the input optical waveguide core is optically coupled to an input end of one of the first output optical waveguide core and the second output optical waveguide core. The output end of the input optical waveguide core is optically coupled via the movable mirror to an input end of the other of the first output optical waveguide core and the second output optical waveguide core.

The foregoing optical devices can be used, for example, as 2-output optical switches. In this case, the driving means (driver) drives the movable mirror to make a changeover of optical path between the first output optical waveguide (first output optical waveguide core) and the second output optical waveguide (second output optical waveguide core). For example, the input optical waveguide, the first output optical waveguide, and the second output optical waveguide are formed of planar waveguides, and the light monitoring means (light receiving device) is provided in the planar waveguides; whereby the optical switch with the light monitor function (optical device) can be constructed in compact structure. Whether a path changeover has been made can be determined with certainty by monitoring each of the light passing the first output optical waveguide and the light passing the second output optical waveguide.

Preferably, the movable mirror has a knife edge shape. This reduces polarization-dependent loss due to influence of diffraction of light at the edge part of the movable mirror.

Preferably, the driving means comprises a movable electrode supporting the movable mirror, a stationary electrode provided so as to face the movable mirror, and means for generating an electrostatic force between the movable electrode and the stationary electrode. When the movable mirror is moved by use of the electrostatic force in this manner, the electric current flows little, so as to achieve power saving.

Preferably, the driver includes: a stationary electrode; a movable electrode coupled to the movable mirror; and a voltage source for applying a voltage between the movable electrode and the stationary electrode.

DESCRIPTION OF THE PREFERRED EMBODIMENTS

The preferred embodiments of optical devices according to the present invention will be described below with reference to the drawings.

Figure 1:
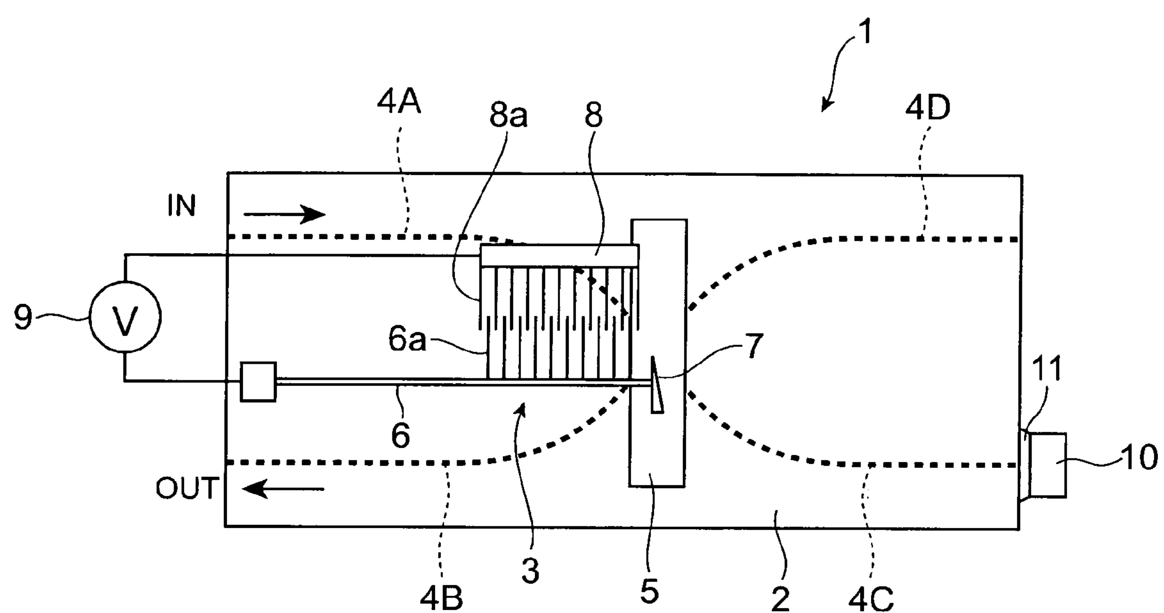
FIG. 1 is a plan view showing a first embodiment of an optical device according to the present invention.

FIG. 1 is a plan view showing a first embodiment of an optical device according to the present invention. In the same figure, the optical device 1 of the present embodiment is an optical variable attenuator. The optical variable attenuator 1 has a planar waveguide 2 made of silica glass or the like, and an actuator structure 3 formed on the planar waveguide 2 and made of silicon with electrical conductivity or the like.

The planar waveguide 2 is provided with four optical waveguide cores 4A-4D. The optical waveguide cores 4A-4D are formed in a substantially crossed pattern across a groove 5 extending in the width direction of the planar waveguide 2. The optical waveguide core 4A is an input optical waveguide core for input of an optical signal. The optical waveguide core 4B is an output optical waveguide core for outputting an optical signal from the input optical waveguide core 4A. The optical waveguide core 4C is an auxiliary optical waveguide core for guiding light that does not enter the output optical waveguide core 4B, out of the optical signal from the input optical waveguide core 4A, and is formed on the opposite side to the optical waveguide cores 4A, 4B with respect to the groove 5. The optical waveguide core 4D is an unused optical waveguide core.

The actuator structure 3 provided on the planar waveguide 2 as described above is formed by the micro electro mechanical system (MEMS) technology. The actuator structure 3 has a movable electrode 6 cantilevered on a substrate (not shown), and fingers 6*a* are provided at the distal end part of this movable electrode 6.

A movable mirror 7 is fixed and supported at the tip of the movable electrode 6. This movable mirror 7 is constructed so as to get into the groove 5 of the planar waveguide 2 to reflect an optical signal emerging from the input optical waveguide core 4A, toward the output optical waveguide core 4B. Namely, an output end of the input optical waveguide core 4A is optically coupled via the movable mirror 7 to an input end of the output optical waveguide core 4B, and the output end of the input optical waveguide core 4A is optically coupled directly to an input end of the optical waveguide core 4C. The surface of the movable mirror 7 is coated with Au or the like. This increases the reflectance for light in the optical communication wavelength bands such as infrared light, whereby insertion loss can be reduced.

The movable mirror 7 preferably has a knife edge shape the edge tip angle of which is larger than 0° and smaller than 90°. This reduces influence of diffraction of light occurring at the edge part of the movable mirror 7 when the light emerging from the input optical waveguide core 4A impinges upon the movable mirror 7, and thus can suppress the polarization-dependent loss (PDL) caused by the light diffraction effect.

The actuator structure 3 also has a stationary electrode 8 provided on the top surface of the planar waveguide 2. This stationary electrode 8 is provided with fingers 8*a* so as to face the fingers 6*a*of the movable electrode 6.

The movable electrode 6 and the stationary electrode 8 are connected through a voltage source 9. The movable electrode 6, stationary electrode 8, and voltage source 9 constitute a driver for driving the movable mirror 7. When this voltage source 9 applies a voltage between the movable electrode 6 and the stationary electrode 8, an electrostatic force is generated between them to move the movable mirror 7 in the direction traversing the input optical waveguide core 4A (cf. FIG. 3). When the movable mirror 7 is driven by the electrostatic force in this manner, no electric current flows, thereby achieving power saving. Since the interdigital structure of the movable electrode 6 and stationary electrode 8 enhances the electrostatic force occurring between the movable electrode 6 and the stationary electrode 8, the movable mirror 7 can be driven at a low voltage.

A light receiving device (e.g., a photodiode) 10 for receiving light passing the auxiliary optical waveguide core 4C is provided at the exit end position of the auxiliary optical waveguide core 4C in one end face of the planar waveguide 2. This light receiving device 10 is a device for monitoring the intensity (light quantity) of the light passing the auxiliary optical waveguide core 4C.

Figure 2:
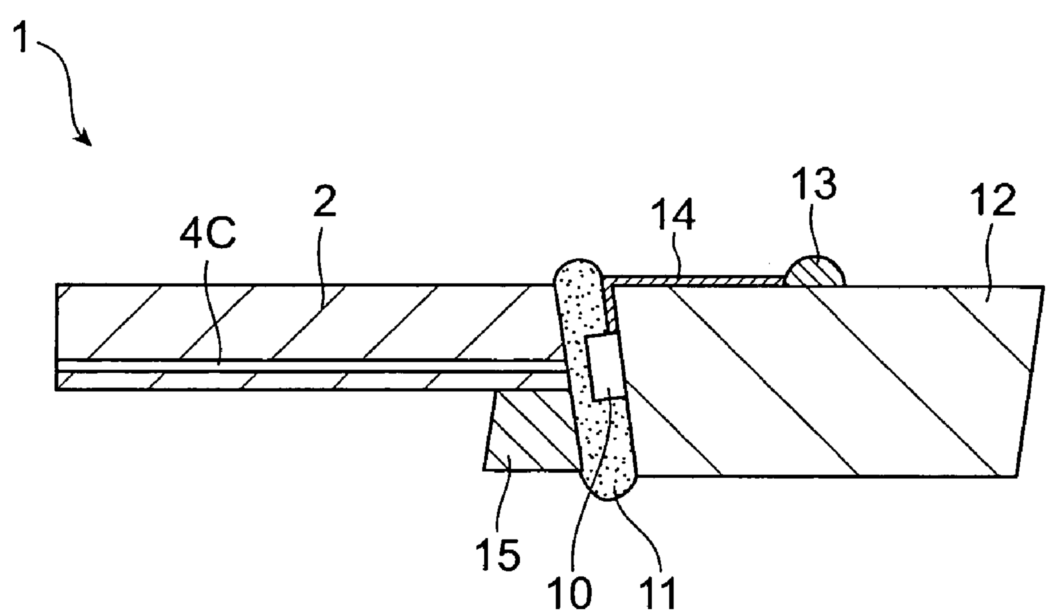
FIG. 2 is a sectional view showing a securing structure for a light receiving device shown in FIG. 1.

The light receiving device 10 is fixed with resin 11 to one end face of the planar waveguide 2 so as to face the auxiliary optical waveguide core 4C, as shown in FIGS. 1 and 2. The one end face of the planar waveguide 2 is fixed with the resin 11 to a submount 12. A wire pad 13 is provided on a mount surface of the submount 12, and the wire pad 13 is connected through a wire bonding line 14 to the light receiving device 10. The one end face of the planar waveguide 2 is obliquely formed in order to prevent reflection by the light receiving device 10. A lid 15 is provided at one end of the planar waveguide 2.

In the optical variable attenuator 1 as described above, the movable electrode 6 extends straight as shown in FIG. 1, in the initial state in which no voltage is applied by the voltage source 9. In this state, the major part of the optical signal emerging from the input optical waveguide core 4A passes through the interior of the groove 5 without being reflected by the movable mirror 7, and enters the auxiliary optical waveguide core 4C, so that little light enters the output optical waveguide core 4B. This makes the optical attenuation amount of the optical variable attenuator 1 almost maximum (a shuttered state).

Figure 3:
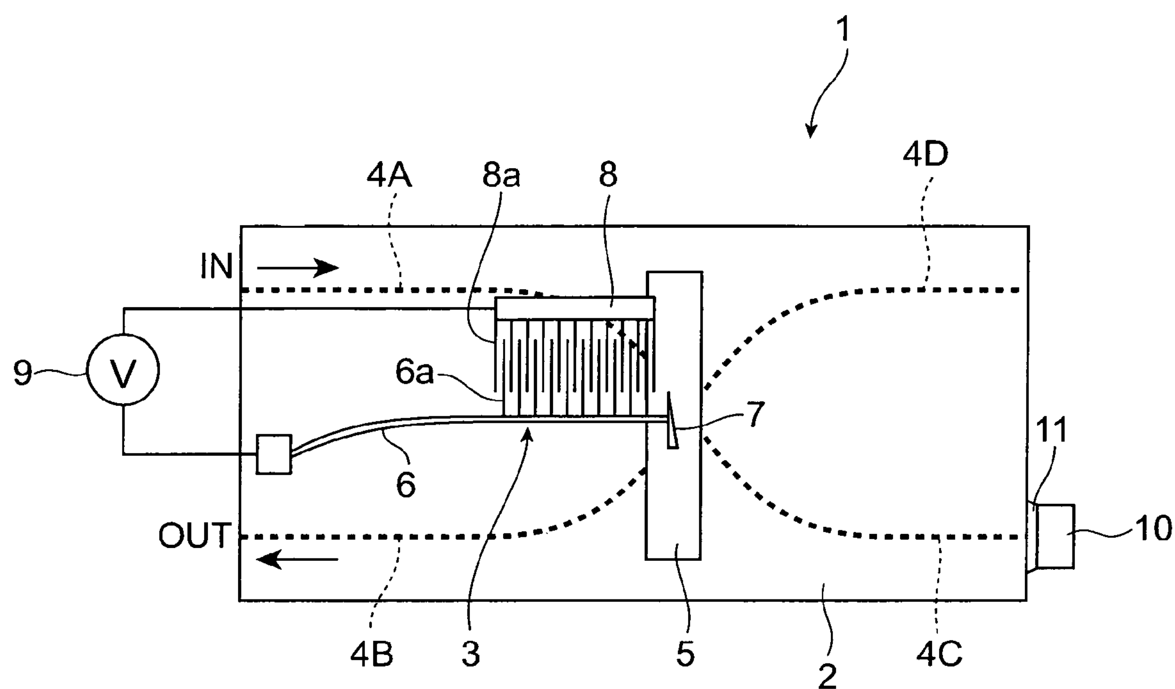
FIG. 3 is a plan view showing an operating state of the optical device shown in FIG. 1.

As the voltage applied by the voltage source 9 is increased from the initial state, the distal end part of the movable electrode 6 is attracted toward the stationary electrode 8 to be bent by an electrostatic force occurring between the movable electrode 6 and the stationary electrode 8, as shown in FIG. 3, whereby the movable mirror 7 moves toward the stationary electrode 8. This increases the light reflected by the movable mirror 7, out of the optical signal emerging from the input optical waveguide core 4A, so as to increase the light entering the output optical waveguide core 4B. Therefore, the optical attenuation amount of the optical variable attenuator 1 decreases according to the moving amount of the movable mirror 7.

The attenuator may be arranged in a configuration reverse to the above; i.e., the optical attenuation amount of the optical variable attenuator 1 is minimum in the initial state and the optical attenuation amount of the optical variable attenuator 1 increases with increase in the applied voltage.

At this time, the light receiving device 10 properly monitors the light quantity of the light passing the auxiliary optical waveguide core 4C, whereby the light quantity of the optical signal passing the output optical waveguide core 4B after attenuated can be obtained. Namely, if the light quantity of the optical signal passing the input optical waveguide core 4A is preliminarily known, the light quantity of the optical signal after attenuated can be obtained by subtracting the light quantity of the light passing the auxiliary optical waveguide core 4C from the light quantity of the optical signal passing the input optical waveguide core 4A.

Therefore, a desired optical attenuation amount can always be attained by controlling the optical attenuation amount through adjustment of the voltage applied by the voltage source 9 on the basis of the monitor result by the light receiving device 10, even with characteristic variations of the optical variable attenuator 1 itself, temperature change, or the like. This enhances the reliability of the optical variable attenuator 1.

Since the present embodiment adopts, the configuration as described above wherein the optical variable attenuator 1 is comprised of the planar waveguide 2 and the actuator structure 3 and wherein the light receiving device 10 for monitoring the light quantity of the light passing the auxiliary optical waveguide core 4C is mounted on the planar waveguide 2, the structure of the optical variable attenuator with the light quantity monitor function can be simplified and compactified, so as to enable achievement of cost reduction.

Figure 4:
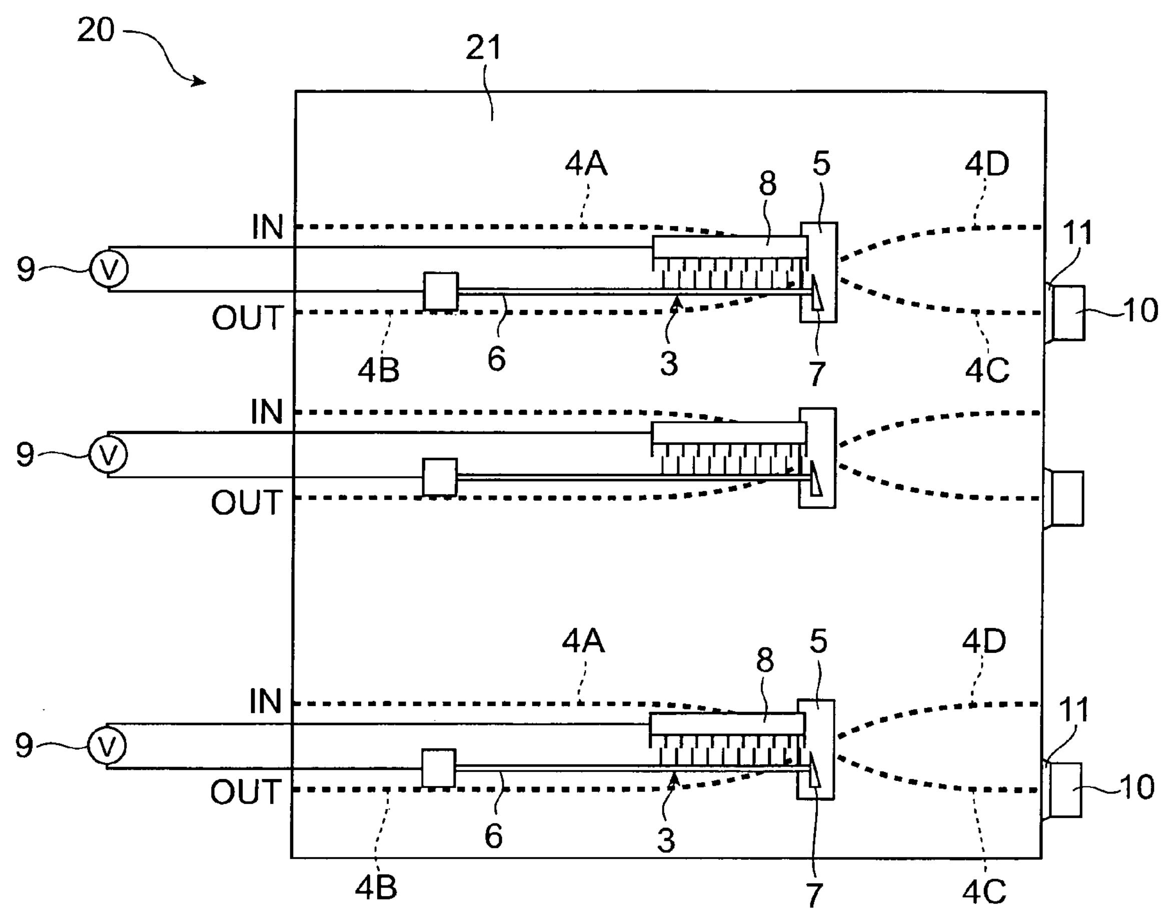
FIG. 4 is a plan view showing a modification example of the first embodiment of the optical device according to the present invention.

FIG. 4 is a plan view showing an optical variable attenuator array as a modification example of the above embodiment. In the same figure, the optical variable attenuator array 20 has a planar waveguide 21, and this planar waveguide 21 is provided with multiple sets of optical waveguide cores 4A-4D and groove 5 arranged in parallel. A plurality of actuator structures 3 are provided in parallel corresponding to the respective sets of optical waveguide cores 4A-4D on the planar waveguide 21. Light receiving devices 10 are mounted at exit end positions of the respective auxiliary optical waveguide cores 4C in one end face of the planar waveguide 21.

The array pitch of the sets of optical waveguide cores 4A-4D, the array pitch of actuator structures 3, and the array pitch of light receiving devices 10 all are not more than 500 μm. This enables achievement of compact structure even in the case where the foregoing optical variable attenuators are arrayed.

Figure 5:
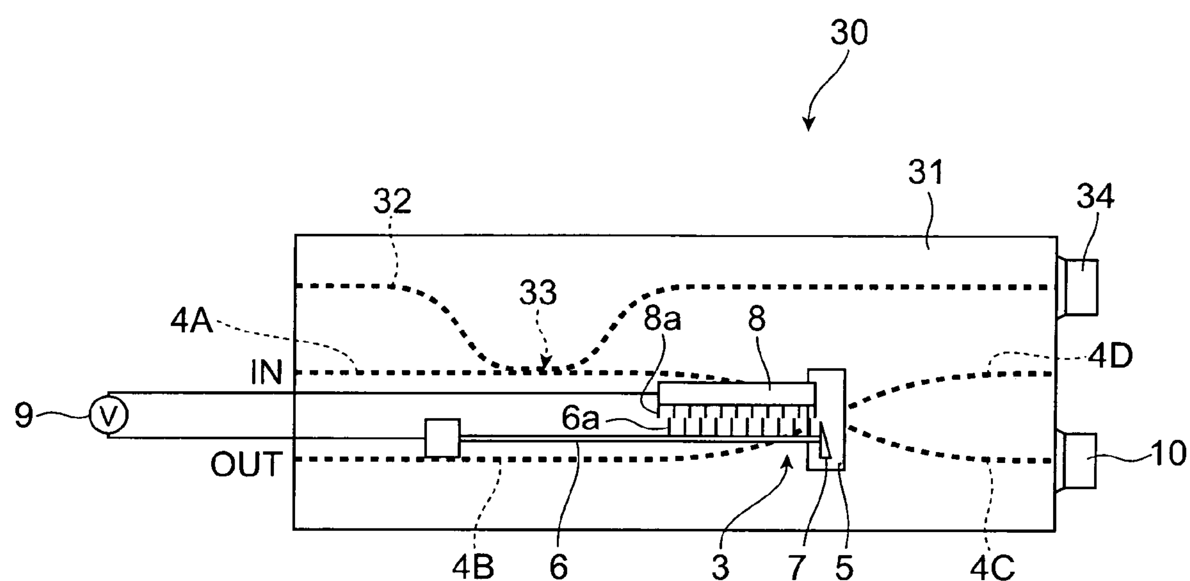
FIG. 5 is a plan view showing a second embodiment of an optical device according to the present invention.

FIG. 5 is a plan view showing a second embodiment of an optical device according to the present invention. In the drawing identical or equivalent members to those in the first embodiment are denoted by the same reference symbols, and the description thereof will be omitted.

In the same figure, an optical variable attenuator 30 being an optical device of the present embodiment has a planar waveguide 31, and an actuator structure 3 provided on this planar waveguide 31. The planar waveguide 31 is provided with the aforementioned optical waveguide cores 4A to 4D and groove 5.

The planar waveguide 31 is also provided with a branch optical waveguide core 32 connected to the input optical waveguide core 4A. This branch optical waveguide core 32 collaborates with the input optical waveguide core 4A to form a directional coupler (optical coupler) 33 to make a part branch off from the optical signal passing the input optical waveguide core 4A.

The light receiving device 10 for receiving the light passing the auxiliary optical waveguide core 4C is provided at the exit end position of the auxiliary optical waveguide core 4C in one end face of the planar waveguide 31, and a light receiving device 34 for receiving the light (branched light) passing the branch optical waveguide core 32 is provided at the exit end position of the branch optical waveguide core 32. By monitoring the intensity (light quantity) of the light passing the branch optical waveguide core 32 by the light receiving device 34, it is feasible to securely acquire the light quantity of the optical signal passing the input optical waveguide core 4A before attenuated.

The present embodiment adopted the configuration wherein the light receiving device 10 was provided on the exit end side of the auxiliary optical waveguide core 4C in order to grasp the light quantity of the optical signal passing the output optical waveguide core 4B after attenuated, but, without having to be limited to this in particular, it is also possible to adopt a configuration wherein a branch optical waveguide core is connected to the output optical waveguide core 4B to form a directional coupler for making a part branch off from the optical signal passing the output optical waveguide core 4B and wherein the light receiving device 10 is provided on the exit end side of the branch optical waveguide core.

Figure 6:
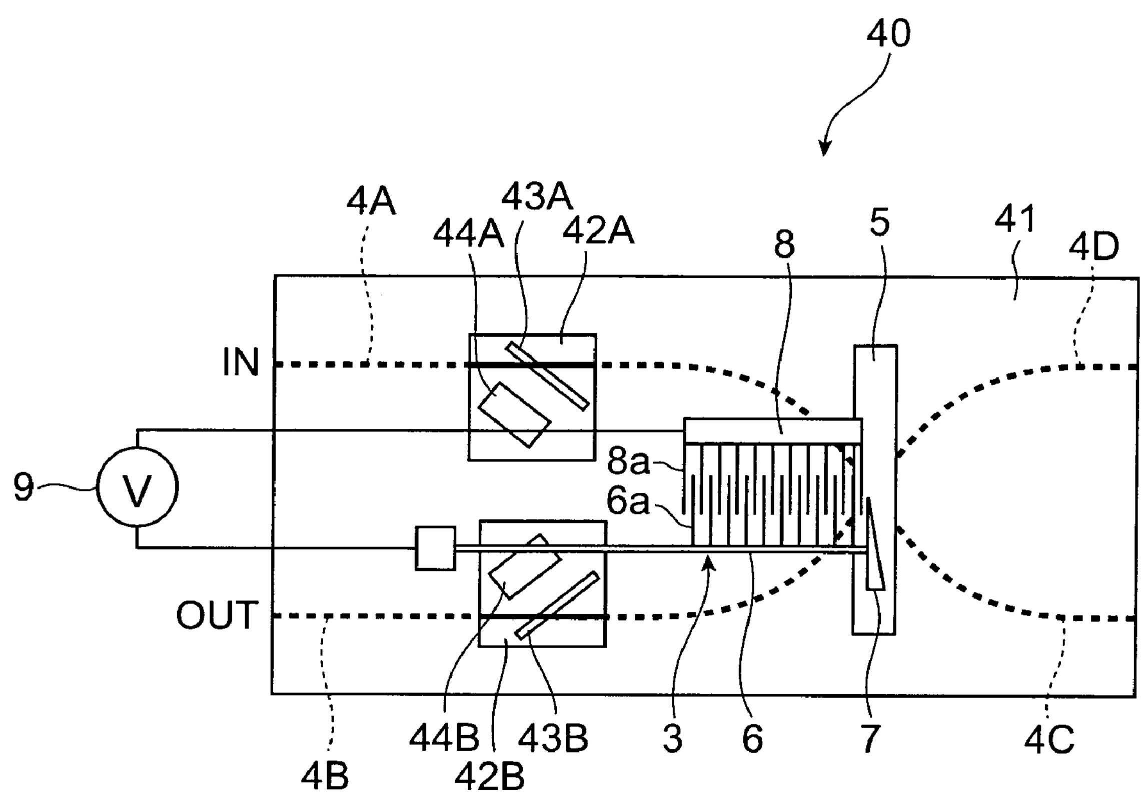
FIG. 6 is a plan view showing a third embodiment of an optical device according to the present invention.

FIG. 6 is a plan view showing a third embodiment of an optical device according to the present invention. In the drawing identical or equivalent members to those in the first embodiment are denoted by the same reference symbols, and the description thereof will be omitted.

In the same figure, an optical variable attenuator 40 being an optical device of the present embodiment has a planar waveguide 41, and an actuator structure 3 provided on this planar waveguide 41. The planar waveguide 41 is provided with the aforementioned optical waveguide cores 4A-4D and groove 5.

Recesses 42A, 42B are formed so as to expose a part of the input optical waveguide core 4A and the output optical waveguide core 4B, in the planar waveguide 41. Set in the recess 42A are a branching filter 43A for extracting part of the optical signal passing the input optical waveguide core 4A, and a light receiving device 44A for receiving the light extracted by this branching filter 43A. Set in the recess 42B are a branching filter 43B for extracting part of the optical signal passing the output optical waveguide core 4B, and a light receiving device 44B for receiving the light extracted by this branching filter 43B.

In this case, it is feasible to securely acquire the light quantity of the optical signal passing the input optical waveguide core 4A before attenuated. Since the light quantity of the optical signal passing the output optical waveguide core 4B after attenuated is directly monitored, the light quantity of the optical signal after attenuated can be directly acquired.

Figure 7:
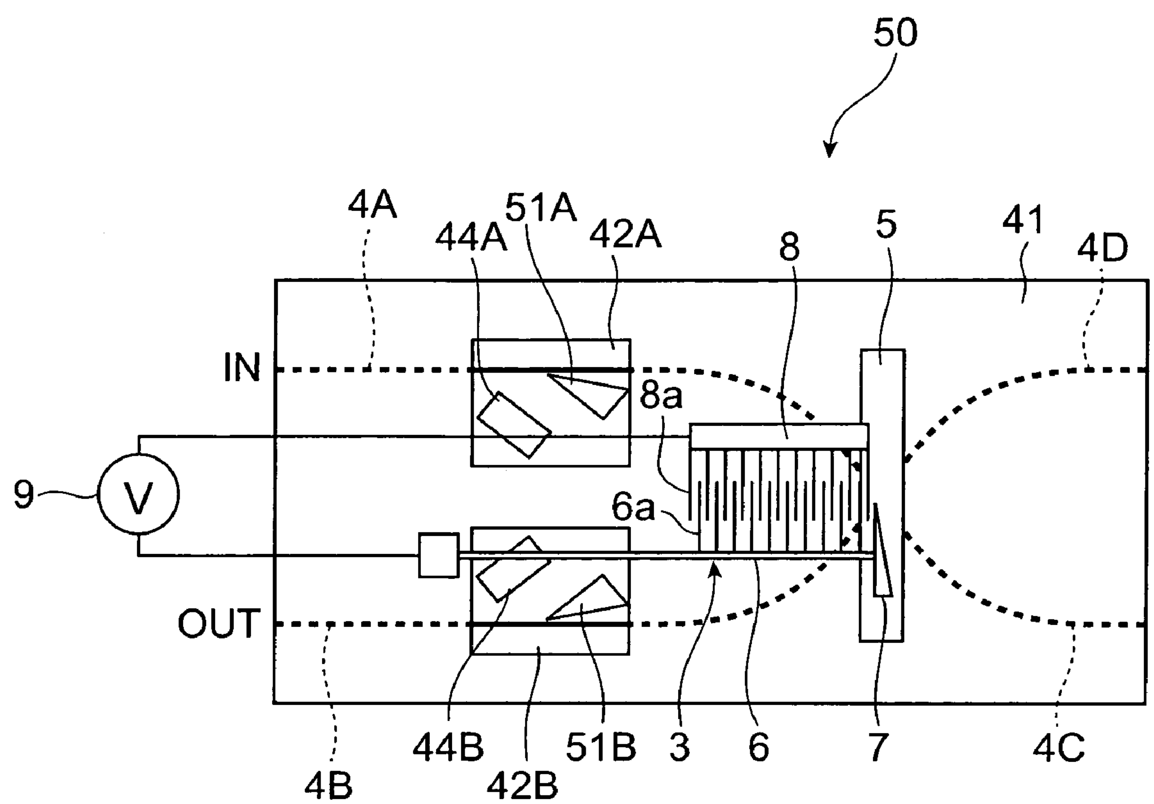
FIG. 7 is a plan view showing a fourth embodiment of an optical device according to the present invention.

FIG. 7 is a plan view showing a fourth embodiment of an optical device according to the present invention. In the drawing identical or equivalent members to those in the third embodiment are denoted by the same reference symbols, and the description thereof will be omitted.

In the same figure, an optical variable attenuator 50 being an optical device of the present embodiment has branching mirrors 51A, 51B, instead of the branching filters 43A, 43B in the third embodiment. The branching mirror 51A is for reflecting part of the optical signal passing the input optical waveguide core 4A, and the branching mirror 51B is for reflecting part of the optical signal passing the output optical waveguide core 4B. The light receiving devices 44A, 44B receive the light reflected by the branching mirror 51A and the light reflected by the branching mirror 51B, respectively.

Figure 8:
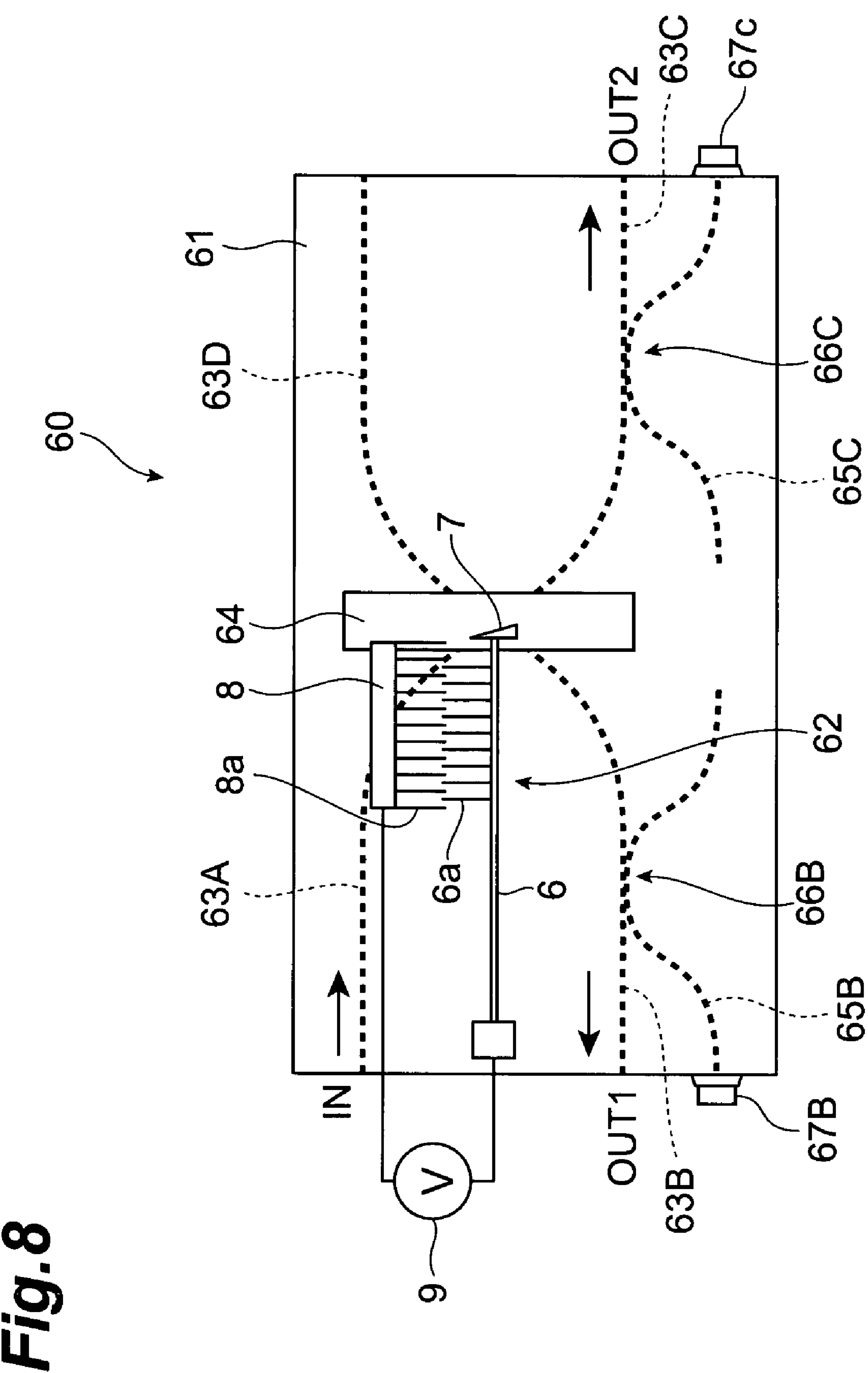
FIG. 8 is a plan view showing a fifth embodiment of an optical device according to the present invention.

FIG. 8 is a plan view showing a fifth embodiment of an optical device according to the present invention. In the drawing identical or equivalent members to those in the first embodiment are denoted by the same reference symbols, and the description thereof will be omitted.

In the same figure, the optical device 60 of the present embodiment is an optical switch of a 1×2 (1-input 2-output) type. The optical switch 60 has a planar waveguide 61, and an actuator structure 62 provided on this planar waveguide 61. The actuator structure 62 has a structure similar to the actuator structure 3 in the first embodiment.

Optical waveguide cores 63A-63D are formed in a substantially crossed pattern across a groove 64, in the planar waveguide 61. The optical waveguide core 63A is an input optical waveguide core for input of an optical signal. The optical waveguide core 63B is a first output optical waveguide core for outputting an optical signal from the input optical waveguide core 63A. The optical waveguide core 63C is a second output optical waveguide core for outputting an optical signal from the input optical waveguide core 63A and is formed on the opposite side to the optical waveguide cores 63A, 63B with respect to the groove 64. The optical waveguide core 63D is an unused optical waveguide core. In this optical device 60, an output end of the input optical waveguide core 63A is optically coupled via the movable mirror 7 to an input end of the first output optical waveguide core 63B, and the output end of the input optical waveguide core 63A is optically coupled directly to an input end of the second output optical waveguide core 63C.

The planar waveguide 61 is provided with branch optical waveguide cores 65B, 65C connected to the output optical waveguide cores 63B, 63C, respectively. Each branch optical waveguide core 65B, 65C collaborates with the output optical waveguide core 63B, 63C to form a directional coupler (optical coupler) 66B, 66C to make a part branch off from the optical signal passing the output optical waveguide core 63B, 63C.

A light receiving device 67B for receiving the branched light passing the branch optical waveguide core 65B is provided at the exit end position of the branch optical waveguide core 65B in one end face of the planar waveguide 61. A light receiving device 67C for receiving the branched light passing the branch optical waveguide core 65C is provided at the exit end position of the branch optical waveguide core 65C in the other end face of the planar waveguide 61.

In the optical switch 60 as described above, the movable electrode 6 extends straight as shown in FIG. 8, in the initial state in which no voltage is applied by the voltage source 9. In this state the optical signal emerging from the input optical waveguide core 63A is reflected by the movable mirror 7 to enter the first output optical waveguide core 63B. On the other hand, when the voltage source 9 applies a predetermined voltage between the movable electrode 6 and the stationary electrode 8, the distal end part of the movable electrode 6 is attracted toward the stationary electrode 8 to be bent by an electrostatic force occurring between the two electrodes, whereby the movable mirror 7 moves toward the stationary electrode 8. In this state, the optical signal emerging from the input optical waveguide core 63A passes through the interior of the groove 64 without being reflected by the movable mirror 7, and then enters the second output optical waveguide core 63C.

At this time, the light receiving devices 67B, 67C monitor the light quantities of the optical signals passing the respective output optical waveguide cores 65B, 65C, whereby it is feasible to surely determine whether a switchover has been made between the output optical waveguide cores 63B, 63C for outputting the optical signal.

The optical device 60 of the present embodiment is the 1×2 type optical switch, but it is also possible to construct a 2×2 type optical switch using the optical waveguide core 63D as another input optical waveguide core.

Figure 9:
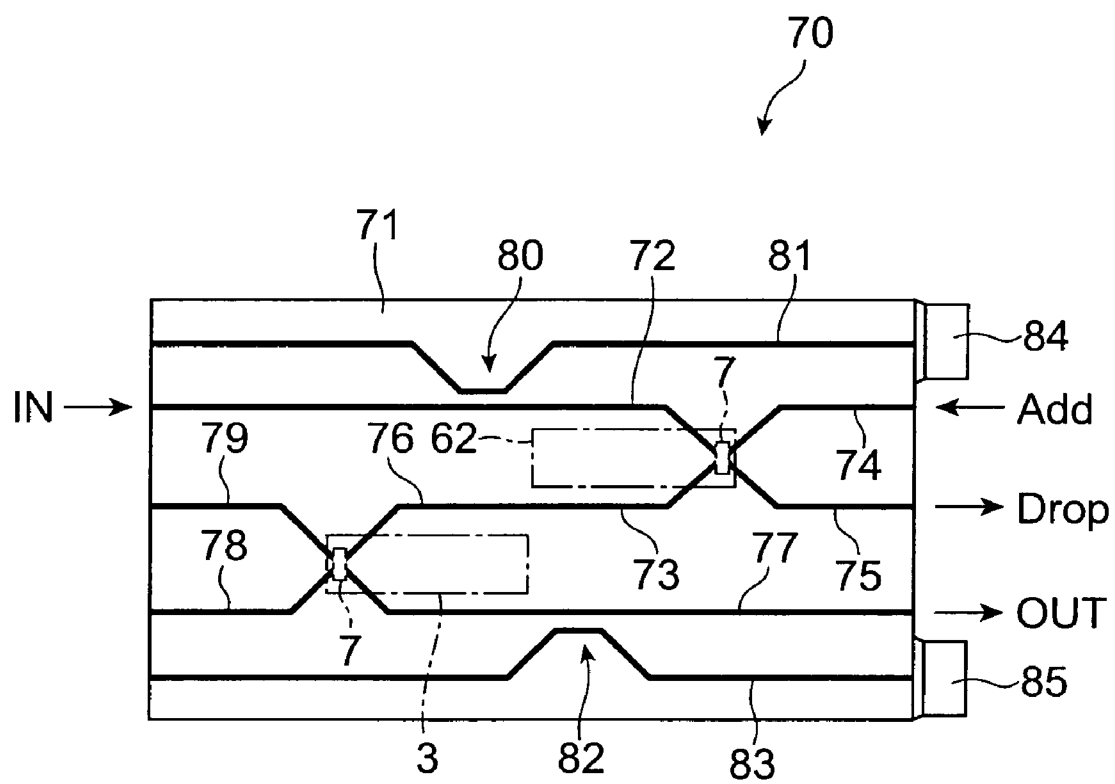
FIG. 9 is a schematic plan view showing a sixth embodiment of an optical device according to the present invention.

FIG. 9 is a schematic plan view showing a sixth embodiment of an optical device according to the present invention. In the same drawing the optical device 70 of the present embodiment is a combination of an optical variable attenuator with a 2×2 type optical switch and has an optical Add/Drop function.

The optical device 70 has a planar waveguide 71, and this planar waveguide 71 is provided with optical waveguide cores 72-75 formed in a substantially crossed pattern across a groove (not shown), and with optical waveguide cores 76-79 formed in a substantially crossed pattern across a groove (not shown). The optical waveguide cores 73, 76 are directly connected to each other. The optical waveguide core 72 is an input optical waveguide core for input of an optical signal, and the optical waveguide core 77 is an output optical waveguide core for outputting an optical signal from the input optical waveguide core 72. The optical waveguide core 78 is an auxiliary optical waveguide core for guiding light that does not enter the output optical waveguide core 77, out of the optical signal from the input optical waveguide core 72. The optical waveguide core 74 is an Add optical waveguide core, and the optical waveguide core 75 a Drop optical waveguide core.

The planar waveguide 71 is also provided with a branch optical waveguide core 81 forming a directional coupler 80 for making a part branch off from the optical signal passing the input optical waveguide core 72, and with a branch optical waveguide core 83 forming a directional coupler 82 for making a part branch off from the optical signal passing the output optical waveguide core 77. Light receiving devices 84, 85 for receiving the branched light passing the branch optical waveguide cores 81, 83 are provided at the output end positions of the branch optical waveguide cores 81, 83 in one end face of the planar waveguide 71.

The optical waveguide cores 76 to 79 of the planar waveguide 71 as described above form a part of the optical variable attenuator, while the optical waveguide cores 72 to 75 form a part of the optical switch. Provided on the planar waveguide 71 are an actuator structure 3 forming a part of the optical variable attenuator, and an actuator structure 62 forming a part of the optical switch.

In the optical device 70 as described above, in the normal state an optical signal injected into the input optical waveguide core 72 is reflected by the movable mirror 7 of the actuator structure 62 to enter the optical waveguide core 73. Then the optical signal passes the optical waveguide core 76 to be attenuated into a predetermined light quantity by the movable mirror 7 of the actuator structure 3, and is then outputted in that state from the output optical waveguide core 77.

On the other hand, for optical Add/Drop, the movable mirror 7 of the actuator structure 62 is moved. This results in outputting the optical signal injected into the input optical waveguide core 72, from the Drop optical waveguide core 75. Light added into the Add optical waveguide core 74 is guided through the optical waveguide cores 73, 76 to be outputted from the output optical waveguide core 77.

Figure 10:
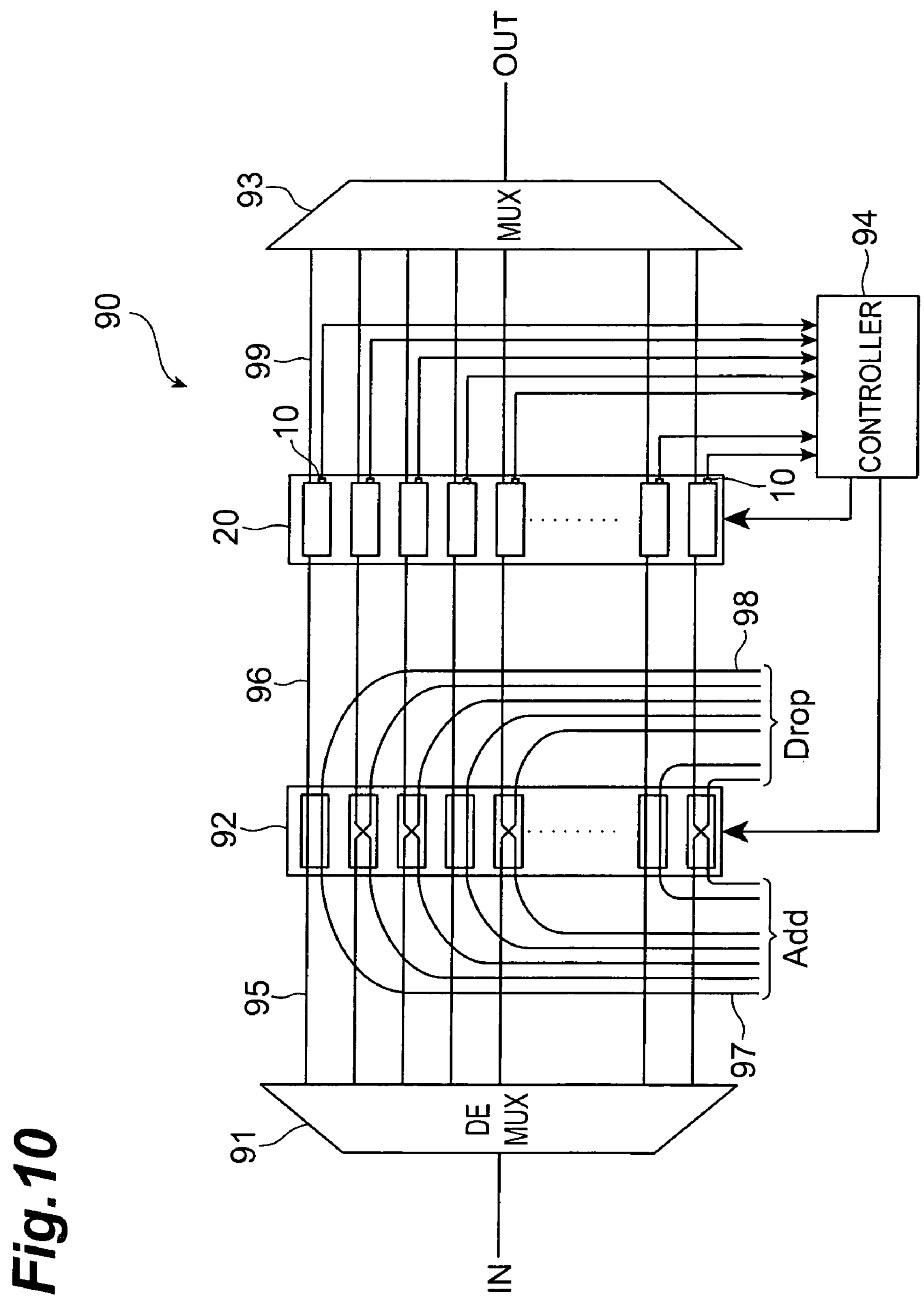
FIG. 10 is a schematic configuration diagram showing a seventh embodiment of an optical device according to the present invention.

FIG. 10 is a schematic configuration diagram showing a seventh embodiment of an optical device according to the present invention. In the same figure, the optical device 90 of the present embodiment is an Optical Add/Drop Multiplexer (OADM) incorporating optical variable attenuators and 2×2 type optical switches.

The optical device 90 has a demultiplexer 91, an optical switch array 92, the aforementioned optical variable attenuator array 20 shown in FIG. 4, a multiplexer 93, and a controller 94. The demultiplexer 91 demultiplexes a plurality of optical signals of different wavelengths on a wavelength-by-wavelength basis.

The optical switch array 92 has a plurality of 2×2 optical switches. The optical switch array 92 is connected through a plurality of optical fibers 95 to the demultiplexer 91 and is also connected through a plurality of optical fibers 96 to the optical variable attenuator array 20. A plurality of Add optical fibers 97 and a plurality of Drop optical fibers 98 are connected to the optical switch array 92. The optical switch array 92 functions to switch between optical paths of the optical fibers 95 to 98.

The optical variable attenuator array 20 is connected through a plurality of optical fibers 99 to the multiplexer 93. The multiplexer 93 multiplexes the optical signals of the respective wavelengths attenuated by the optical variable attenuator array 20.

Output signals from the respective light receiving devices 10 in the optical variable attenuator array 20 are fed to the controller 94. The controller 94 has a voltage source for supplying a voltage to the optical switch array 92, and a voltage source for supplying a voltage to the optical variable attenuator array 20. The controller 94 feeds a voltage signal to the optical switch array 92 to perform control on optical path switching, and feeds a voltage signal to the optical variable attenuator array 20 so as to control the optical attenuation amount to a desired value, based on output values of the respective light receiving devices 10.

The present invention is by no means intended to be limited to the above embodiments. For example, the optical variable attenuators of the above embodiments had the optical waveguide core 4B into which the optical signal reflected by the movable mirror 7 was injected, as an output optical waveguide core, and the optical waveguide core 4C into which the light not reflected by the movable mirror 7 was injected, as an auxiliary optical waveguide core, but the present invention does not have to be limited to this configuration in particular; for example, the optical waveguide core 4C may be used as an output optical waveguide core, and the optical waveguide core 4B as an auxiliary optical waveguide core.

The above embodiments employed the configuration wherein the movable mirror 7 was driven by the electrostatic force occurring between the movable electrode 6 and the stationary electrode 8, but an electromagnetic actuator utilizing electromagnetic force or the like may be used as a means for driving the movable mirror 7.

As described above with the preferred embodiments, the present invention enables achievement of compact structure of the optical devices even with the optical monitor function where the optical devices incorporate the optical variable attenuator and/or the optical switch.

What is claimed is:

1. An optical device comprising:

a planar optical waveguide including:

an input optical waveguide for input of an optical signal;

an output optical waveguide for outputting an optical signal from the input optical waveguide; and an auxiliary optical waveguide for guiding light that does not enter the output optical waveguide, out of the optical signal from the input optical waveguide;

a movable mirror for reflecting the optical signal from the input optical waveguide toward the output optical waveguide or toward the auxiliary optical waveguide;

driving means for driving the movable mirror; and light monitoring means for monitoring light passing at least one of the input optical waveguide, the output optical waveguide, and the auxiliary optical waveguide, wherein the light monitoring means is provided on an end face of the planar optical waveguide.

2. The optical device according to claim 1, wherein the light monitoring means comprises a light receiving device for receiving light passing the auxiliary optical waveguide, which is provided on the exit end side of the auxiliary optical waveguide.

3. The optical device according to claim 1, wherein the light monitoring means comprises light branching means for extracting part of light passing at least one of the input optical waveguide and the output optical waveguide; and a light receiving device for receiving the light extracted by the light branching means.

4. The optical device according to claim 3, wherein the light branching means is a branching optical waveguide forming a directional coupler, and wherein the light receiving device is provided on the exit end side of the branching optical waveguide.

5. The optical device according to claim 3, wherein the light branching means is a branching filter, and wherein the light receiving device is provided at a position where light extracted by the branching filter is to be received.

6. The optical device according to claim 3, wherein the light branching means is a branching mirror, and wherein the light receiving device is provided at a position where light extracted by the branching mirror is to be received.

7. The optical device according to claim 1, wherein the movable mirror has a knife edge shape.

8. The optical device according to claim 1, wherein the driving means comprises a movable electrode supporting the movable mirror, a stationary electrode provided so as to face the movable mirror, and means for generating an electrostatic force between the movable electrode and the stationary electrode.

* * * * *